(12) United States Patent
Ikeda et al.

(10) Patent No.: US 11,701,967 B2
(45) Date of Patent: Jul. 18, 2023

(54) DISPLAY CONTROL DEVICE, DISPLAY CONTROL METHOD, AND STORAGE MEDIUM

(71) Applicant: HONDA MOTOR CO., LTD., Tokyo (JP)

(72) Inventors: Masaya Ikeda, Wako (JP); Yasuharu Hashimoto, Wako (JP); Taichi Sogo, Wako (JP); Masayuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 677 days.

(21) Appl. No.: 16/820,796

(22) Filed: Mar. 17, 2020

(65) Prior Publication Data

US 2020/0307380 A1 Oct. 1, 2020

(30) Foreign Application Priority Data

Mar. 28, 2019 (JP) .............................. JP2019-064004

(51) Int. Cl.
  *B60K 35/00* (2006.01)
  *B60W 30/16* (2020.01)
  *B60W 30/12* (2020.01)
  *G01C 21/36* (2006.01)
  *B60W 50/14* (2020.01)

(52) U.S. Cl.
  CPC ............. *B60K 35/00* (2013.01); *B60W 30/12* (2013.01); *B60W 30/16* (2013.01); *B60W 50/14* (2013.01); *G01C 21/367* (2013.01); *G01C 21/3676* (2013.01); *B60K 2370/16* (2019.05); *B60W 2050/146* (2013.01)

(58) Field of Classification Search
  CPC ... B60K 35/00; B60K 2370/16; B60W 30/12; B60W 30/16; B60W 50/14; B60W 2050/146; G01C 21/367; G01C 21/3676
  See application file for complete search history.

(56) References Cited

U.S. PATENT DOCUMENTS

| 8,346,426 B1 | 1/2013 | Szybalski et al. |
| 2015/0278611 A1* | 10/2015 | Chi ................ G06V 20/586 |
| | | 348/148 |

FOREIGN PATENT DOCUMENTS

| CN | 103052976 | 4/2013 |
| CN | 108973994 | 12/2018 |
| JP | 2008-049918 | 3/2008 |
| JP | 2018-062237 | 4/2018 |
| JP | 2018-097431 | 6/2018 |

OTHER PUBLICATIONS

Chinese Office Action for Chinese Patent Application No. 202010172949.5 dated Jan. 20, 2023.

* cited by examiner

*Primary Examiner* — Michael D Lang
(74) *Attorney, Agent, or Firm* — Amin, Turocy & Watson, LLP

(57) ABSTRACT

A display control device includes a display that is configured to display information, a detector that is configured to detect a partition line for partitioning a lane on a road on which a vehicle is present, and a display controller that is configured to cause the display to display the partition line detected by the detector variably, and the display controller is configured to change a length of the partition line which is displayed by the display on the basis of a detection distance of the detector.

7 Claims, 10 Drawing Sheets

DISPLAY CONTROL DEVICE, DISPLAY CONTROL METHOD, AND STORAGE MEDIUM

CROSS-REFERENCE TO RELATED APPLICATION

This application is based upon and claims the benefit of priority from Japanese Patent Application No. 2019-064004, filed Mar. 28, 2019, the entire content of which is incorporated herein by reference.

BACKGROUND

Field of the Invention

The present invention relates to a display control device, a display control method, and a storage medium.

Description of Related Art

There has been progress in research for automatically controlling driving of a vehicle (hereinafter referred to as automated driving). In connection with this, a technique for displaying a lane near a host vehicle and icons indicating the host vehicle and another vehicle on a display is known (see, for example, Specification of U.S. Pat. No. 8,346,426).

SUMMARY

However, in the related art, a lane display mode was inappropriate, and erroneous information was transmitted to an occupant in some cases. As a result, a sense of unease was given to an occupant in some cases.

An aspect of the present invention is to provide a display control device, a display control method, and a storage medium that make it possible to give a sense of security to an occupant.

A display control device, a display control method, and a storage medium according to the present invention have the following configurations adopted therein.

(1) According to an aspect of the present invention, there is provided a display control device including: a display that is configured to display information; a detector that is configured to detect a partition line for partitioning a lane on a road on which a vehicle is present; and a display controller that is configured to cause the display to display the partition line detected by the detector variably, wherein the display controller is configured to change a length of the partition line which is displayed by the display on the basis of a detection distance of the detector.

(2) In the aspect of the above (1), the display controller is configured to superimpose the partition line and the road and cause the display to display the superimposed image in a first section of the road that overlaps a detection region of the detector when seen from at least any one viewpoint, and cause the display to display the road without superimposing the partition line in a second section of the road that does not overlap the detection region when seen from the viewpoint.

(3) In the aspect of the above (1) or (2), the display controller is configured to convert the partition line detected by the detector into a linear shape and cause the display to display the converted shape.

(4) In the aspect of the above (2), the detector includes a first sensor that is configured to detect the partition line from an image obtained by capturing the road and a second sensor that radiates electromagnetic waves to a periphery of the vehicle to detect another vehicle, and in a case where the second sensor detects another vehicle in the second section, the display controller is configured to virtually extend the partition line detected by the first sensor in the first section up to the second section to superimpose the extended partition line on the road.

(5) In any one aspect of the above (1) to (4), in a case where the vehicle travels on a road which is not included in a map, the display controller is configured to cause the display to display the partition line and the road.

(6) In any one aspect of the above (1) to (5), the vehicle is a vehicle of which at least one of steering or a speed is controlled, and in a case where the steering of the vehicle is controlled, the display controller is configured to cause the display to display the partition line.

(7) According to another aspect of the present invention, there is provided a display control method including causing a computer mounted in a vehicle including a display that is configured to display information and a detector that is configured to detect a partition line for partitioning a lane on a road on which the vehicle is present to: cause the display to display the partition line detected by the detector variably; and change a length of the partition line which is displayed by the display on the basis of a detection distance of the detector.

(8) According to another aspect of the present invention, there is provided a computer readable non-transitory storage medium having a program stored therein, the program causing a computer mounted in a vehicle including a display that is configured to display information and a detector that is configured to detect a partition line for partitioning a lane on a road on which the vehicle is present to execute: causing the display to display the partition line detected by the detector variably; and changing a length of the partition line which is displayed by the display on the basis of a detection distance of the detector.

According to any aspect of (1) to (8), it is possible to give a sense of security to an occupant.

DESCRIPTION OF EMBODIMENTS

Hereinafter, an embodiment of a display control device, a display control method, and a storage medium of the present invention will be described with reference to the accompanying drawings. In the embodiment, an example in which a recognition result of the periphery of a vehicle is displayed on a display device when driving assistance of the vehicle is performed will be described. The driving assistance involves, for example, controlling at least one of the steering and speed of a vehicle such as an adaptive cruise control system (ACC) or a lane keeping assistance system (LKAS), or controlling both of them. Particularly, controlling the steering and speed of a vehicle is also called automated driving. A case where rules of left-hand traffic are applied will be described below, but in a case where rules of right-hand traffic are applied, the right and left may be interchanged.

[Overall Configuration]

Figure 1:
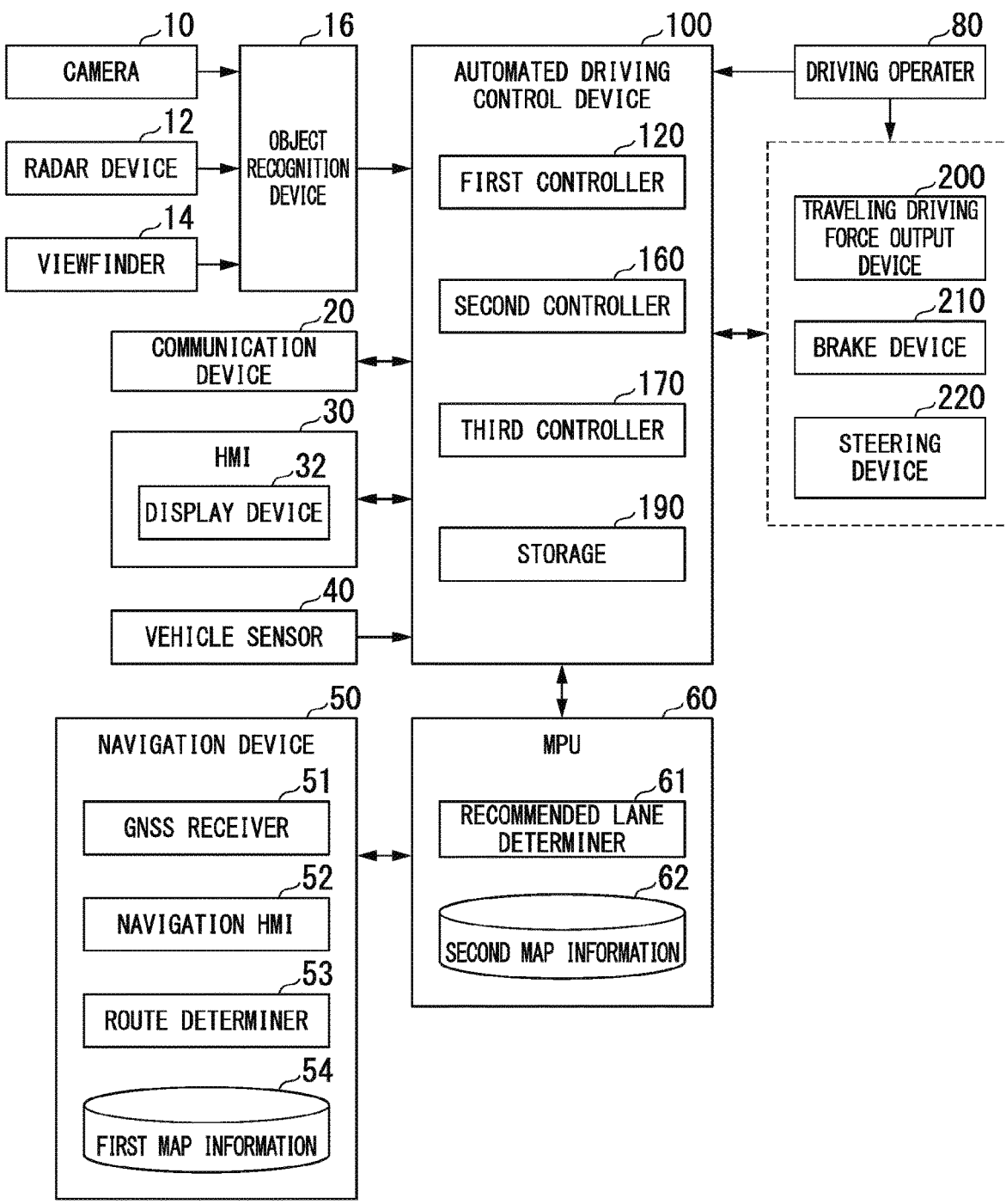
FIG. 1 is a configuration diagram of a vehicle system using a display control device according to an embodiment.

FIG. 1 is a configuration diagram of a vehicle system 1 using a display control device according to an embodiment. A vehicle in which the vehicle system 1 is mounted (hereinafter referred to as a host vehicle M) is, for example, a two-wheeled, three-wheeled, or four-wheeled vehicle or the like. The driving sources of such vehicles include an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device 20, a human machine interface (HMI) 30, a vehicle sensor 40, a navigation device 50, a map positioning unit (MPU) 60, a driving operator 80, an in-vehicle camera 90, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on the host vehicle M. In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera. The camera 10 is an example of a "first sensor."

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system. The radar device 12 is an example of a "second sensor."

The viewfinder 14 is a sensor using a light detection and ranging (LIDAR) system. The viewfinder 14 irradiates the vicinity of the host vehicle M with light, and measures scattered light. The viewfinder 14 detects a distance to an object on the basis of a time from light emission to light reception. The irradiation light is, for example, pulsed laser light. The viewfinder 14 is installed at any point on the host vehicle M. The viewfinder 14 is another example of the "second sensor."

The object recognition device 16 recognizes the position, type, speed, or the like of an object by performing a sensor fusion process on the results of detection performed by some or all of the camera 10, the radar device 12, and the viewfinder 14. The object recognition device 16 outputs recognition result to the automated driving control device 100. The object recognition device 16 may output the detection results of the camera 10, the radar device 12, and the viewfinder 14, as they are, to the automated driving control device 100. The object recognition device 16 may be omitted from the vehicle system 1.

The communication device 20 communicates with another vehicle which is present in the periphery of the host vehicle M using, for example, a cellular network, a Wi-Fi network, Bluetooth (registered trademark, omitted hereinafter), dedicated short range communication (DSRC), or the like, or communicates with various server devices through a wireless base station.

The HMI 30 presents various types of information to an occupant of the host vehicle M, and accepts the occupant's input operation. For example, the HMI 30 includes a display device 32. The display device 32 includes a first display 32A and a second display 32B. The HMI 30 may further include a speaker, a buzzer, a touch panel, or the like. The display device 32 is an example of a "display."

Figure 2:
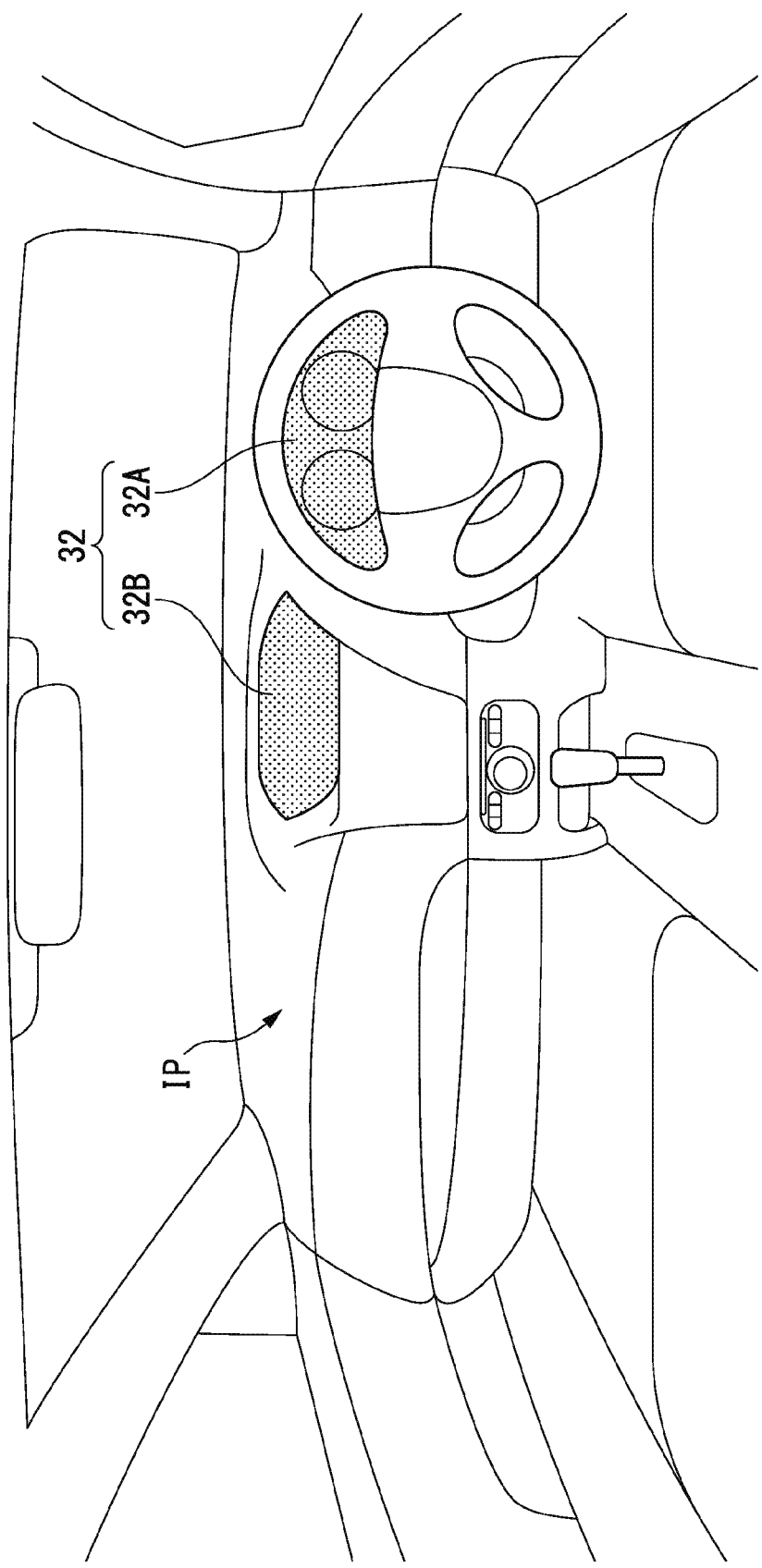
FIG. 2 is a diagram schematically showing an interior appearance of a host vehicle.

FIG. 2 is a diagram schematically showing an interior appearance of the host vehicle M. For example, the first display 32A is provided in the vicinity of the front of a driver's seat (a seat closest to a steering wheel) in an instrument panel IP, and is installed at a position that can be visually recognized by an occupant from a gap in a steering wheel or over the steering wheel. The first display 32A is, for example, a liquid crystal display (LCD), an organic electro luminescence (EL) display device, or the like. Information required for traveling of the host vehicle M during manual driving or during driving assistance is displayed on the first display 32A as an image. The information required for traveling of the host vehicle M during manual driving is, for example, the speed, engine speed, remaining amount of fuel, radiator water temperature, traveling distance, or other information of the host vehicle M. The information required for traveling of the host vehicle M during driving assistance is, for example, a future trajectory of the host vehicle M (a target trajectory to be described later), the presence or absence of lane change, a lane that is a lane change destination, or information on a recognized lane (partition line), another vehicle or the like. The information required for traveling of the host vehicle M during driving assistance may include some of all of the information required for traveling of the host vehicle M during manual driving.

The second display 32B is installed, for example, at the center of the instrument panel IP. The second display 32B is, for example, an LCD, an organic EL display device or the like similarly to the first display 32A. The second display 32B displays, for example, a navigation result of the navigation device 50 as an image. The second display 32B may display a television program, play a DVD, or display content such as a downloaded movie.

FIG. 1 will be described again. The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used.

The navigation HMI 52 includes a display device, a speaker, a touch panel, a key, and the like. A portion or the entirety of the navigation HMI 52 may be shared with the above-described the HMI 30.

The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60.

The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel along. In a case where a branch point is present in the route on a map, the recommended lane determiner 61 determines a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, information of the type of lane, information of the type of partition line for partitioning a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a direction indicator, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, the second controller 160, the third controller 170, and a storage 190. The first controller 120, the second controller 160, and the third controller 170 are realized by a processor such as, for example, a central processing unit (CPU) or a graphics processing unit (GPU) executing a program (software). Some or all of these components may be realized by hardware (circuit unit; including circuitry) such as a large scale integration (LSI), an application specific integrated circuit (ASIC), or a field-programmable gate array (FPGA), and may be realized by software and hardware in cooperation. The program may be stored in the storage 190 of the automated driving control device 100 in advance, may be stored in a detachable storage medium such as a DVD or a CD-ROM, or may be installed in the storage 190 by the storage medium being mounted in the drive device.

The storage 190 is realized by, for example, an HDD, a flash memory, an electrically erasable programmable read only memory (EEPROM), a read only memory (ROM), a random access memory (RAM), or the like. The storage 190 stores, for example, a program which is read out and executed by a processor.

Figure 3:
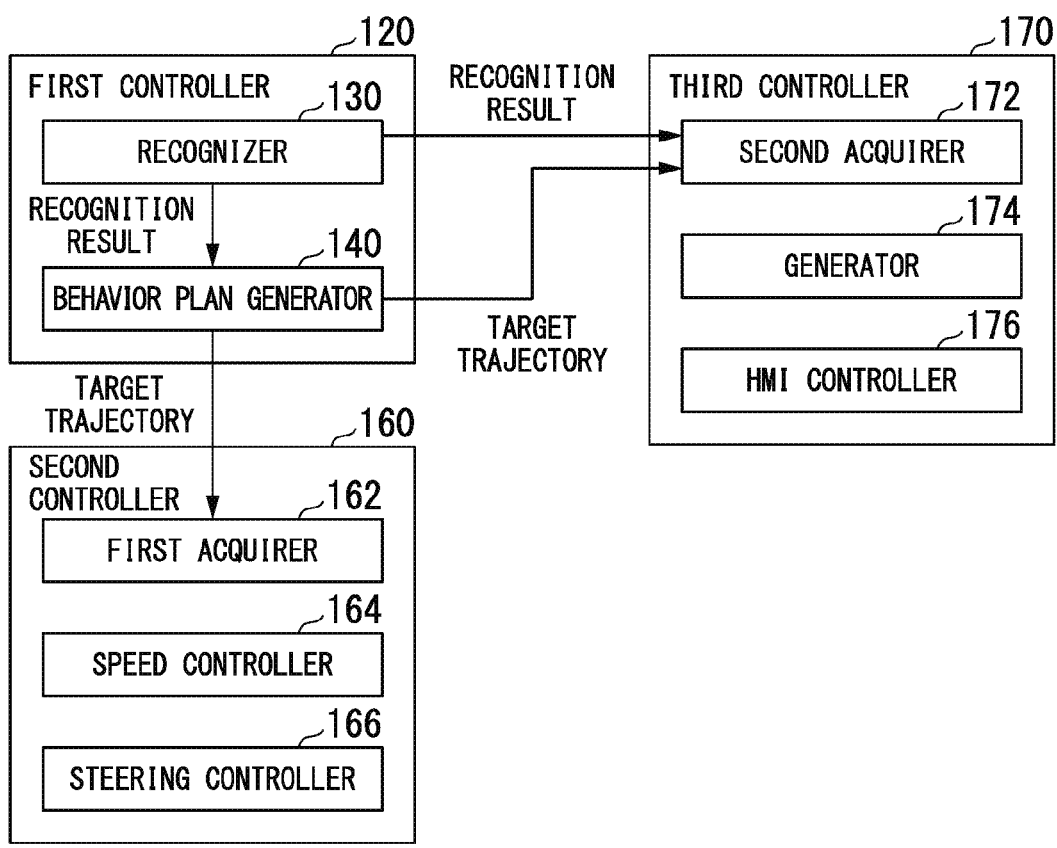
FIG. 3 is a functional configuration diagram of a first controller, a second controller, and a third controller.

FIG. 3 is a functional configuration diagram of the first controller 120, the second controller 160, and the third controller 170. The first controller 120 includes, for example, a recognizer 130 and a behavior plan generator 140. A combination of the camera 10, the radar device 12, the viewfinder 14, the object recognition device 16, and the recognizer 130 is an example of a "detector."

The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes (detects) an object which is present in the periphery of the host vehicle M on the basis of information input directly from the camera 10, the radar device 12, and the viewfinder 14 or information input indirectly through the object recognition device 16. The object recognized by the recognizer 130 is a three-dimensional object or a two-dimensional object. Examples of the three-dimensional object include a bicycle, an autobike, a four-wheeled automobile, a pedestrian, a road sign, a telephone pole, a guardrail, a fallen object, and the like. Examples of the two-dimensional object include a road sign, a partition line and the like drawn on a road.

The recognizer 130 recognizes the state of the position, speed, acceleration or the like of an object. The position of the object is recognized as, for example, a position in relative coordinates (that is, a relative position with respect to the host vehicle M) with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes a host lane in which the host vehicle M is traveling or an adjacent lane which is adjacent to the host lane on the basis of a recognized partition line. For example, the recognizer 130 recognizes a relative position of the host lane or the adjacent lane by comparing a pattern of a road partition line (for example, an array of solid lines and broken lines) obtained from the second map information 62 with a pattern of a road partition line located in the vicinity of the host vehicle M which is recognized from an image of the camera 10.

The recognizer 130 is not limited to the road partition line, and may recognize a relative position between the host lane and its adjacent lane by recognizing a driving boundary (road boundary) including a road partition line, a shoulder, a curbstone, a median strip, a guardrail, or the like. In this recognition, the position of the host vehicle M acquired from the navigation device 50 or processing results based on an INS may be added. The recognizer 130 may further recognize a stop line, an obstacle, a red light, a tollbooth, and other road events.

Upon recognizing a host lane, the recognizer 130 recognizes the relative position or posture of the host vehicle M with respect to the host lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the host lane. Instead, the recognizer 130 may recognize the position of the reference point of the host vehicle M or the like with respect to either lateral end portion (a road partition line or a road boundary) of the host lane, as the relative position of the host vehicle M with respect to the host lane.

The behavior plan generator 140 includes, for example, an event determiner 142 and a target trajectory generator 144. In a case where the host vehicle M is under automated driving in a route in which a recommended lane is determined, the event determiner 142 determines a traveling mode of the automated driving. In the following description, information in which a traveling mode of automated driving is specified is referred to as an event.

Examples of the event include a constant-speed traveling event, a following traveling event, a lane change event, a divergence event, a merging event, an overtaking event, and the like. The constant-speed traveling event is an event of causing the host vehicle M to travel in the same lane at a constant speed. The following traveling event is an event of causing the host vehicle M to follow another vehicle (hereinafter referred to as a preceding vehicle X) which is present within a predetermined distance (within, for example, 100 [m]) in front of the host vehicle M and is closest to the host vehicle M. The "following" may be, for example, a traveling mode of maintaining a constant inter-vehicle distance (relative distance) between the host vehicle M and the preceding vehicle X, or may be a traveling mode of causing the host vehicle M to travel in the center of a host lane in addition to maintaining the inter-vehicle distance between the host vehicle M and the preceding vehicle X. The lane change event is an event of changing the lane of the host vehicle M from the host lane to its adjacent lane. The divergence event is an event of causing the host vehicle M to diverge to a lane on the destination side at a divergence point of a road. The merging event is an event of causing the host vehicle M to merge into a main line at a merging point. The overtaking event is an event of terminating automated driving and switching to manual driving. The event may include, for example, a passing event, an avoidance event or the like. The passing event is an event of temporarily changing the lane of the host vehicle M to its adjacent lane, passing the preceding vehicle X in the adjacent lane and then changing the lane to the original lane again. The avoidance event is an event of causing the host vehicle M to perform at least one of braking and steering in order to avoid an obstacle which is present in front of the host vehicle M.

The event determiner 142 may change, for example, an event already determined with respect to the current section to another event in accordance with a peripheral situation recognized by the recognizer 130 during traveling of the host vehicle M, or may determine a new event with respect to the current section.

The event determiner 142 may change an event already determined with respect to the current section to another event in accordance with an occupant's operation of a vehicle-mounted instrument, or determine a new event with respect to the current section. For example, in a case where an occupant operates a direction indicator, the event determiner 142 may change the event already determined with respect to the current section to a lane change event, and newly determine a lane change event with respect to the current section.

For example, in a case where an occupant operates the lever of a direction indicator (also referred to as a stoke or a switch) to indicate a left turn, the event determiner 142 determines a lane change event of changing the lane of the host vehicle M to an adjacent lane located on the left side when seen from the host vehicle M. For example, in a case where an occupant operates the lever of a direction indicator to indicate a right turn, the event determiner 142 determines a lane change event of changing the lane of the host vehicle M to an adjacent lane located on the right side when seen from the host vehicle M.

The event determiner 142 may determine an event of determining a traveling mode of driving assistance in a route in which a recommended lane is determined. For example, the event determiner 142 determines a following traveling event of causing the preceding vehicle X recognized by the recognizer 130 to follow the host vehicle M (a mode of performing a so-called ACC), or determines a lane keeping event of controlling the steering of the host vehicle M in accordance with the position of a partition line recognized by the recognizer 130 (an event of performing a so-called LKAS).

The target trajectory generator 144 generates a future target trajectory along which the host vehicle M is caused to travel automatically (irrespective of a driver's operation) in a traveling mode specified by an event so that the host vehicle M travels in a recommended lane determined by the recommended lane determiner 61 in principle and copes with its peripheral situation when the host vehicle M travels in the recommended lane. The target trajectory includes, for example, at least one of a position element for determining a future position of the host vehicle M and a speed element for determining a future speed or the like of the host vehicle M.

For example, the target trajectory generator 144 determines a plurality of points (trajectory points) at which the host vehicle M will arrive in order as position elements of a target trajectory. The trajectory points are points at which the host vehicle M will arrive after predetermined traveling distances (for example, approximately every several [m]).

The predetermined traveling distances may be calculated by, for example, a distance along a road when advancing along a route.

The target trajectory generator 144 determines a target speed and a target acceleration for each predetermined sampling time (for example, approximately several tenths of a [sec]) as speed elements of a target trajectory. The trajectory points may be positions at which the host vehicle M will arrive at sampling times for respective predetermined sampling times. In this case, the target speed or the target acceleration is determined by intervals between sampling times and trajectory points. The target trajectory generator 144 outputs information indicating the generated target trajectory to the second controller 160.

The second controller 160 controls the traveling driving force output device 200, the brake device 210, and the steering device 220 so that the host vehicle M passes along the target trajectory generated by the target trajectory generator 144 according to scheduled times.

The second controller 160 includes, for example, a first acquirer 162, a speed controller 164, and a steering controller 166.

The first acquirer 162 acquires information of a target trajectory (trajectory point) from the target trajectory generator 144, and stores the acquired information in the memory of the storage 190.

The speed controller 164 controls one or both of the traveling driving force output device 200 and the brake device 210 on the basis of a speed element (such as, for example, a target speed or a target acceleration) included in a target trajectory stored in the memory.

The steering controller 166 controls the steering device 220 in accordance with a position element included in the target trajectory stored in the memory (such as, for example, a curvature indicating the degree of bend of the target trajectory).

The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and a power electronic control unit (ECU) that controls these components. The power ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information input from the second controller 160 or the information input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

The third controller 170 includes, for example, a second acquirer 172, a generator 174, and a HMI controller 176. The HMI controller 176 is an example of a "display controller."

The second acquirer 172 acquires information of a result recognized by the recognizer 130, and acquires information of a target trajectory generated by the target trajectory generator 144.

The generator 174 generates a first image depicting a partition line recognized (detected) by the recognizer 130 and a second image depicting a road on which the host lane, its adjacent lane or the like is recognized by the recognizer 130 (a road on which the host vehicle M is present). The generator 174 may generate a third image depicting the host vehicle M, another vehicle recognized by the recognizer 130, a target trajectory generated by the behavior plan generator 140, or the like.

The HMI controller 176 causes the HMI 30 to output various types of information. For example, the HMI controller 176 causes the display device 32 of the HMI 30 (particularly, the first display 32A) to display some or all of the first image, the second image, and the third image which are generated by the generator 174.

[Process Flow]

Figure 4:
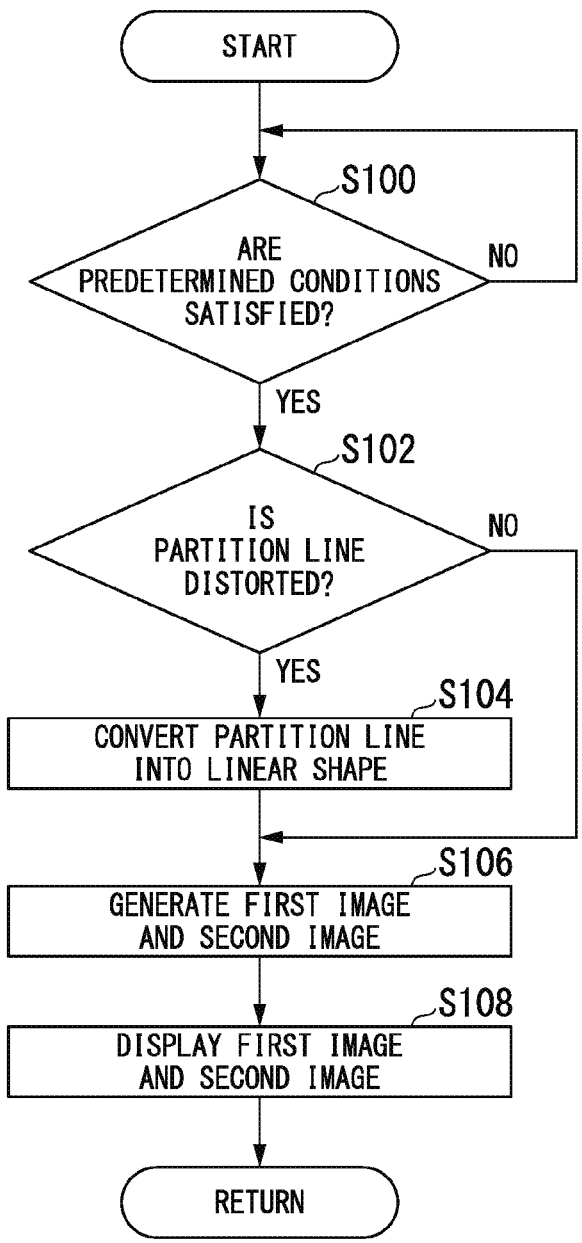
FIG. 4 is a flow chart showing an example of a flow of a series of processes performed by an automated driving control device according to the embodiment.

Hereinafter, a flow of a series of processes performed by the automated driving control device 100 according to the embodiment will be described with reference to a flow chart. FIG. 4 is a flow chart showing an example of a flow of a series of processes performed by the automated driving control device 100 according to the embodiment. The processing of the present flow chart may be repeatedly executed, for example, with a predetermined period. While the processing of the present flow chart is performed, unless otherwise stated, it is assumed that the recognizer 130 continues to perform various types of recognitions such as the recognition of a partition line or the recognition of a lane.

First, the generator 174 determines whether predetermined conditions for generating an image are satisfied (step S100). The predetermined conditions include, for example, a road on which the host vehicle M is currently traveling not being included on a map indicated by the second map information 62. In other words, the predetermined conditions include the recognizer 130 not being able to compare a partition line included in the second map information 62 with a partition line recognized from an image of the camera 10, and not being able to recognize a relative position indicating which lane on a road the host lane or its adjacent lane corresponds to. The predetermined conditions may include, for example, at least driving assistance or automated driving in which the steering of the host vehicle M is controlled being performed. The driving assistance in which the steering of the host vehicle M is controlled includes, for example, an LKAS, and the automated driving in which the steering of the host vehicle M is controlled includes, for example, auto lane changing (ALC) which is performed under a lane change event, a divergence event, or a merging event.

The generator 174 determines whether the partition line recognized by the recognizer 130 is distorted in a case where it is determined that the predetermined conditions are satisfied, that is, a case where a road on which the host vehicle M is currently traveling is not included on a map indicated by the second map information 62, or in a case where driving assistance or automated driving in which the steering of the host vehicle M is controlled is performed (step S102).

In a case where the partition line is distorted, the generator 174 converts the partition line into a virtually linear shape (step S104). On the other hand, in a case where the partition line is not distorted, the generator 174 omits the process of S104, and advances the process to S106.

Next, the generator 174 generates a first image and a second image (step S106). Next, the HMI controller 176 superimposes the first image and the second image generated by the generator 174 and causes the display device 32 to display the superimposed imaged (step S108). This concludes the processing of the present flow chart.

In a case where the conditions that a road on which the host vehicle M is currently traveling is not included on a map indicated by the second map information 62 is satisfied, that is, a case where the condition that a relative position of the host lane or its adjacent lane cannot be recognized is satisfied, the generator 174 cannot determine that an adjacent lane adjacent to the host lane is an opposite lane in a direction opposite to the traveling direction of a vehicle that travels in the host lane, or a parallel traveling lane in the same direction as the traveling direction of the vehicle that travels in the host lane, and thus may generate the first image including only a single lane (host lane) as an image element.

Figure 5:
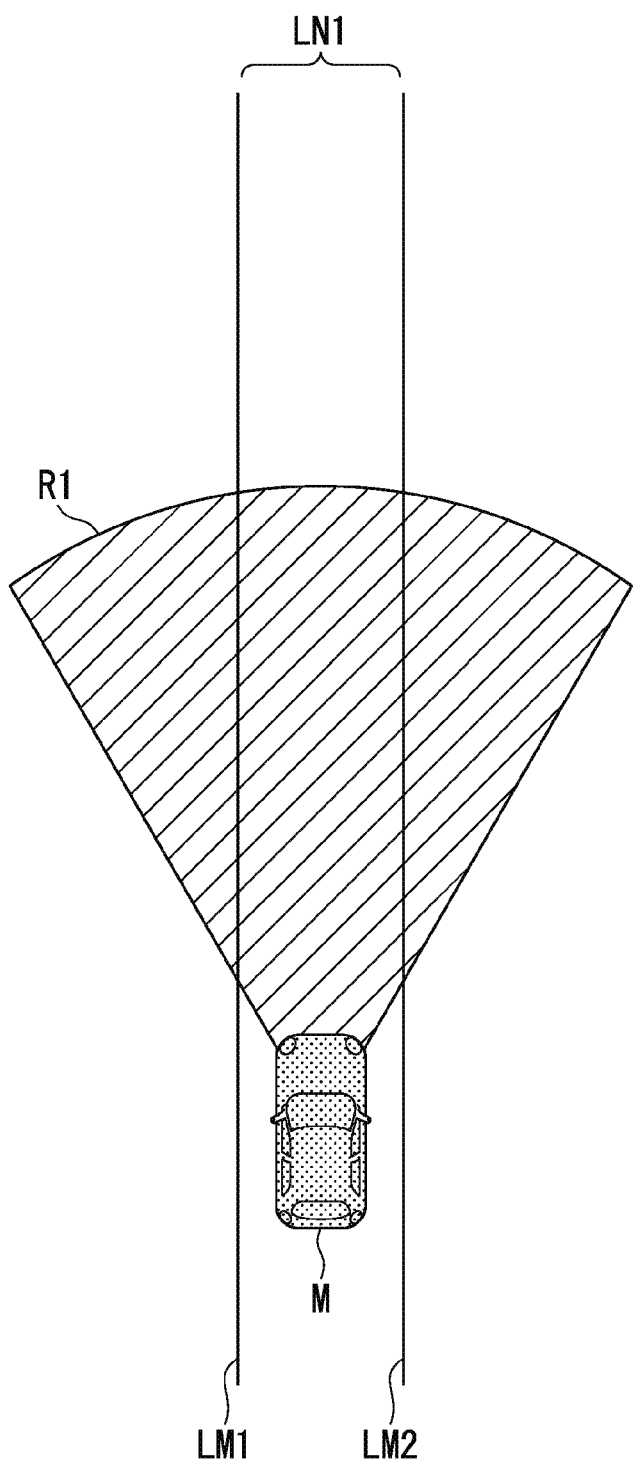
FIG. 5 is a diagram showing an example of a road on which the host vehicle travels.

FIG. 5 is a diagram showing an example of a road on which the host vehicle M travels. In the drawing, LM1 and LM2 represent partition lines having an approximately linear shape. R1 represents a detection region based on the angle of view of the camera 10. In a case where the recognizer 130 recognizes the partition lines LM1 and LM2 from the image of the camera 10, the recognizer recognizes a lane LN1 partitioned by both of the partition lines LM1 and LM2 as a host lane.

Figure 6:
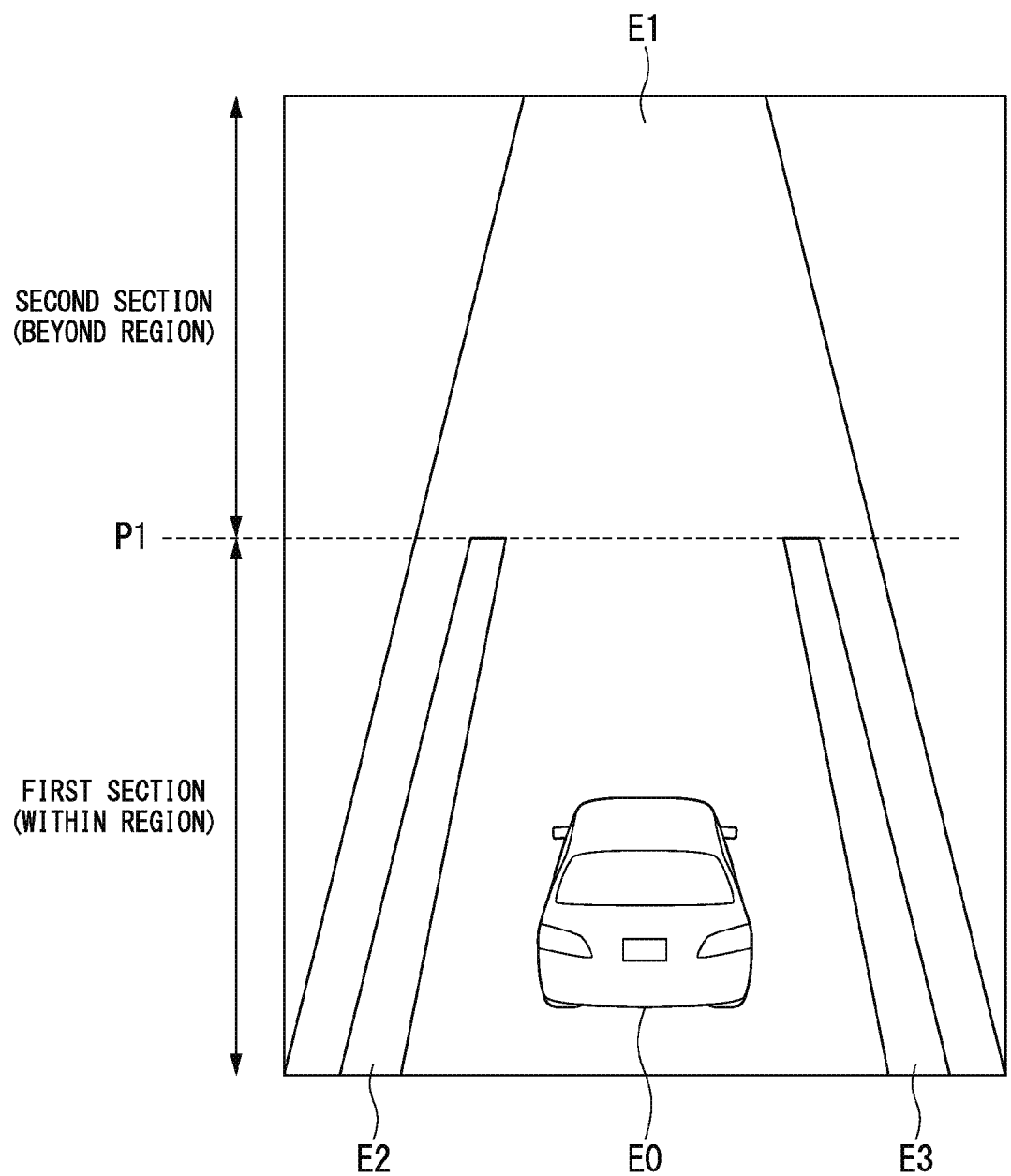
FIG. 6 is a diagram showing an example of an image which is displayed on a display device when the host vehicle is traveling on the road shown in FIG. 5.

FIG. 6 is a diagram showing an example of an image which is displayed on the display device 32 when the host vehicle M is traveling on the road shown in FIG. 5. In the drawing, P1 represents a boundary of the detection region of the camera 10. The boundary P1 is a point of a maximum distance to which the camera 10 can detect a partition line, or a distance having a slight margin from the maximum distance (for example, a short distance of approximately a few [m] to several tens of [m] from the maximum distance). Specifically, the boundary P1 is set to a position at which the partition line can be detected from an image with a degree of accuracy of a threshold or higher through a feature point extraction process or an edge extraction process.

For example, the generator 174 generates the second image in which an element E1 of the image corresponding to the road including the lane LN1 recognized as a host lane extends from the lower end of a display region to its upper end. A direction from the lower end toward the upper end represents the extending direction of the road orthogonal to the width direction of the road. That is, the direction represents the traveling direction of the host vehicle M. The element E1 of the image corresponding to the road may be colored with a predetermined color such as, for example, gray.

On the other hand, the generator 174 generates the first image including an element E2 of an image corresponding to the partition line LM1 detected within the detection region of the camera 10 and an element E3 of an image corresponding to the partition line LM2. In this case, the generator 174 may generate the third image including an element E0 of an image corresponding to the host vehicle M.

The HMI controller 176 changes the length of the partition line which is displayed on the display device 32 as the first image on the basis of detection distances of various sensors such as the camera 10, the radar device 12, and the viewfinder 14. Specifically, when the road indicated as the element E1 is divided into a plurality of sections in the extending direction thereof, the HMI controller 176 superimposes the first image including the elements E2 and E3 on the second image, causes the display device 32 to display the superimposed image in a first section, and causes the display device 32 to display only the second image without superimposing the first image in a second section. The first section is a section that overlaps the detection region of the camera 10 when seen from the upper part of the host vehicle M among the plurality of sections, and the second section is a section that does not overlap the detection region of the camera 10 when seen from the upper part of the host vehicle M. In other words, the first section is a section within the detection region of the camera 10 (a section located further inward than the boundary P1 when seen from the host vehicle M), and is a section in which the partition line can be detected. On the other hand, the second section is a section beyond the detection region of the camera 10 (a section located further outward than the boundary P1 when seen from the host vehicle M), and is a section in which the partition line cannot be detected.

In this manner, the first section in which the vehicle system 1 can recognize the section line and the second section in which the vehicle system cannot recognize the partition line are simultaneously displayed, and an occupant compares the first section with the second section, whereby it can be understood that the vehicle system 1 can correctly recognize a partition line required in the LKAS or ALC. As a result, it is possible to give a sense of security to an occupant under driving assistance or automated driving.

Figure 7:
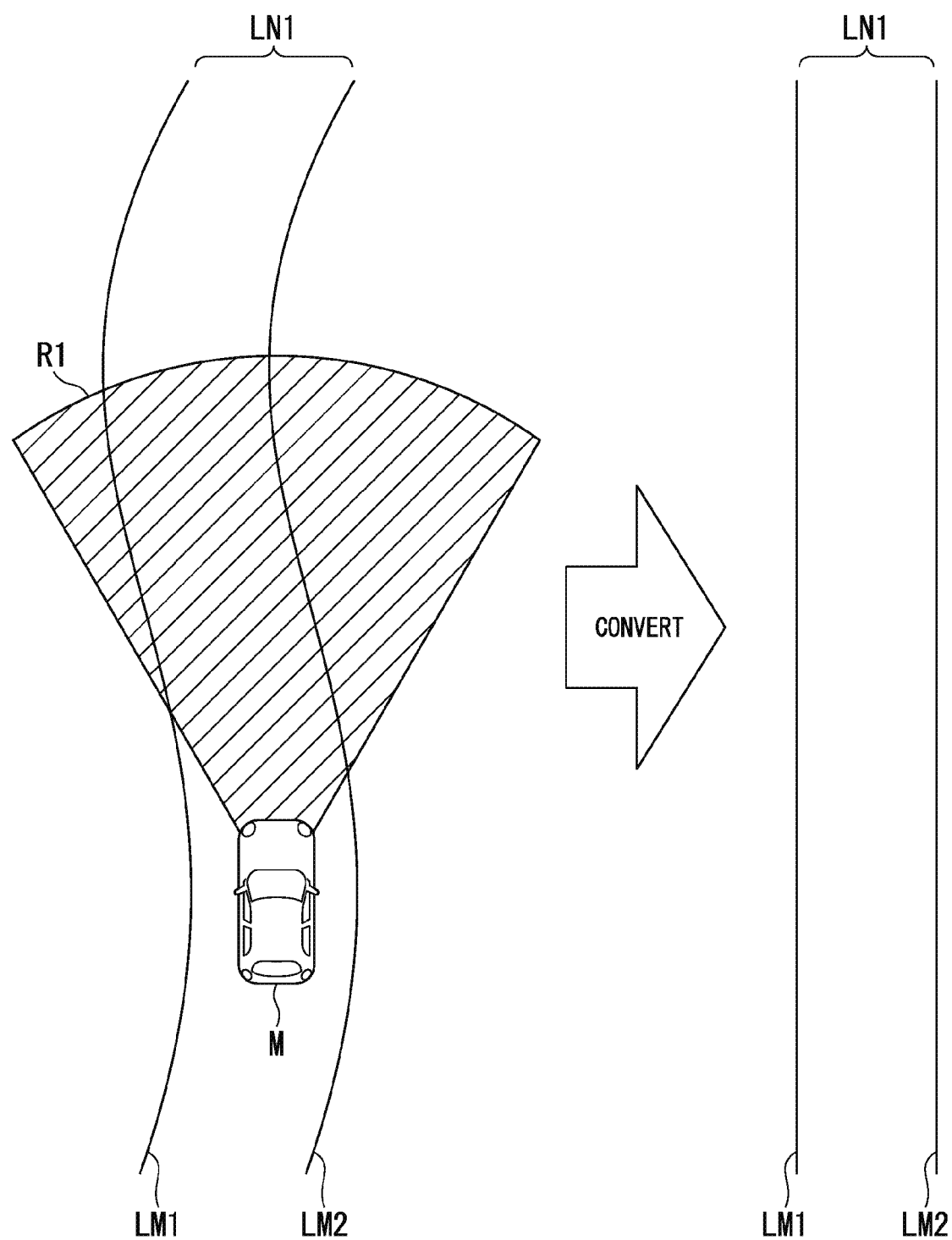
FIG. 7 is a diagram showing another example of a road on which the host vehicle travels.

FIG. 7 is a diagram showing another example of a road on which the host vehicle M travels. In the shown example, the road is curved. In this case, partition lines LM1 and LM2 which are recognized by the recognizer 130 are also curved. In such a case, the generator 174 generates a second image in which the curved road is deformed virtually in a linear shape and a first image in which the curved partition lines LM1 and LM2 are deformed virtually in a linear shape. The HMI controller 176 superimposes the first image and the second image and causes the display device 32 to display the superimposed image. As a result, it is possible to prevent an occupant from staring at the screen of the display device 32 due to the shape of the road varying moment by moment on the screen of the display device 32.

Figure 8:
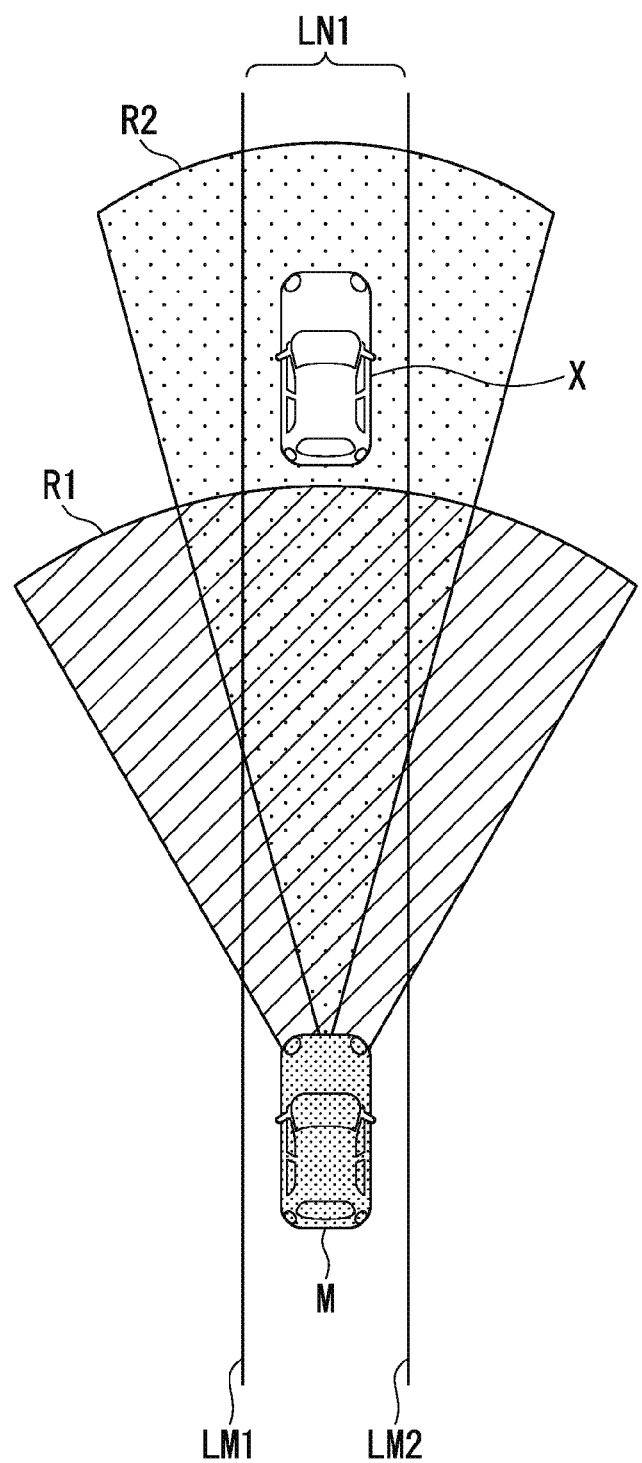
FIG. 8 is a diagram showing another example of a road on which the host vehicle travels.

FIG. 8 is a diagram showing another example of a road on which the host vehicle M travels. In the drawing, X represents a preceding vehicle which is traveling in front of the host vehicle M, and R2 represents a detection region of the radar device 12 or the viewfinder 14. In the shown example, a preceding vehicle X is present beyond a detection region R1 of the camera 10, and is present within a detection region R2 of the radar device 12 of the viewfinder 14. Therefore, the recognizer 130 recognizes the preceding vehicle X on the basis of the detection result of the radar device 12 or the viewfinder 14.

Figure 9:
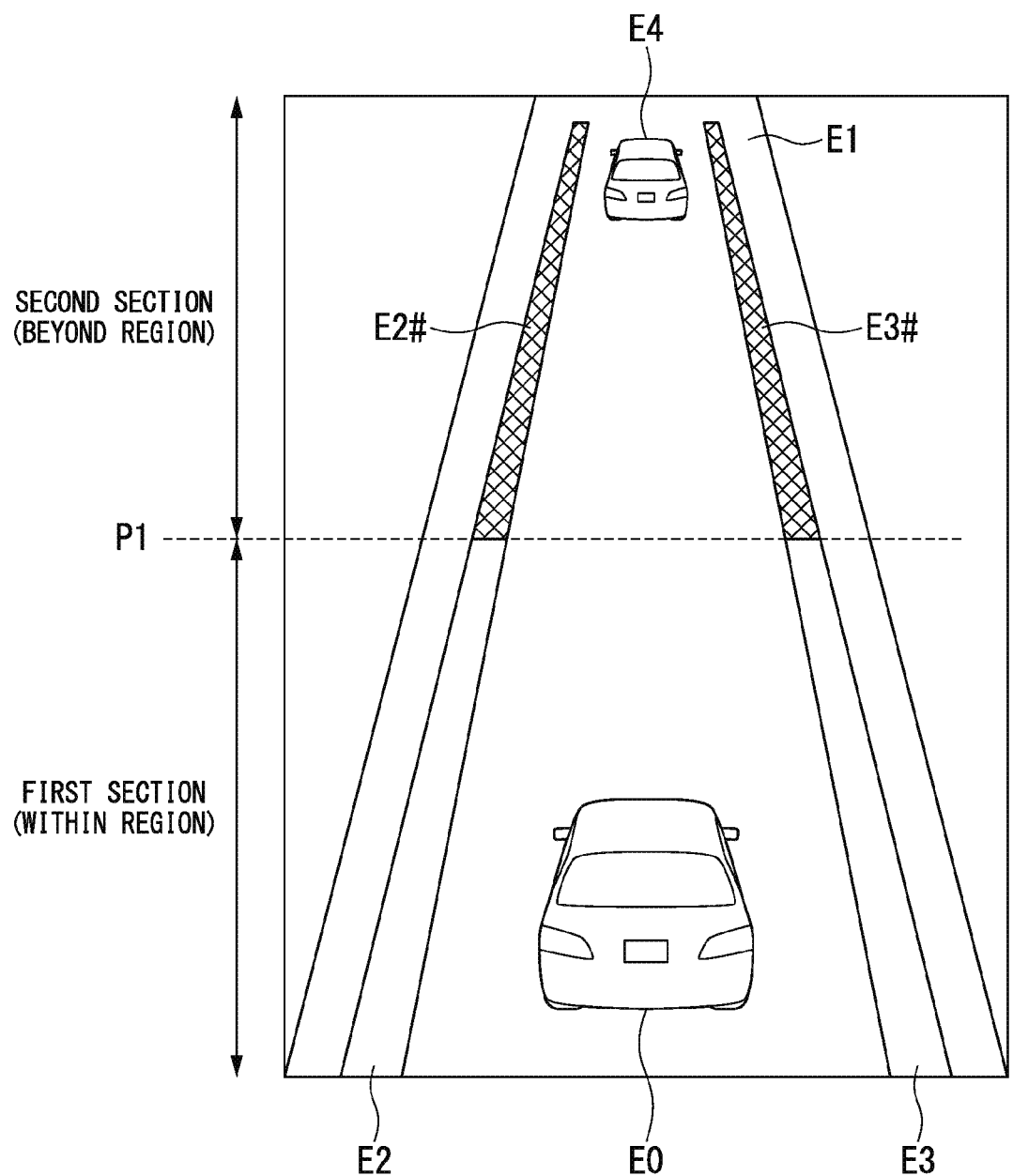
FIG. 9 is a diagram showing an example of an image which is displayed on the display device when the host vehicle travels on the road shown in FIG. 8.

FIG. 9 is a diagram showing an example of an image which is displayed on the display device 32 when the host vehicle M is traveling on the road shown in FIG. 8. In the example of FIG. 8, the preceding vehicle X is recognized beyond the detection region RE That is, in the second section, the partition lines LM1 and LM2 are not detected by the camera 10, whereas it is detected that the preceding vehicle X is traveling in front of the host vehicle M by another sensor such as the radar device 12 or the viewfinder 14. In such a case, it can be determined that there is a high probability of the partition lines LM1 and LM2 being present in the second section even if they are not detected. Therefore, the generator 174 virtually extends the partition lines LM1 and LM2 detected in the first section by the camera 10 up to the second section, and generates a third image including an element E2 # of an image corresponding to an extended virtual partition line LM1 # and an element E3 # of an image corresponding to a virtual partition line LM2 #. In this case, the generator 174 may include an element E4 of an image corresponding to the preceding vehicle X in the third image.

The HMI controller 176 superimposes the first image including the elements E2 and E3 and the third image including the element E0 on the second image including the element E1 and causes the display device 32 to display the superimposed image in the first section, and superimposes the first image including the element E2 # and E3 # and the third image including the element E4 on the second image including the element E1 and causes the display device 32 to display the superimposed image in the second section. This makes it possible to prevent the partition line from being broken off between the first section and the second section, and thus an occupant is less likely to feel a feeling of discomfort.

According to the embodiment described above, in the first section of the road that overlaps detection regions of various sensors such as the camera 10 when seen from at least any one viewpoint, the first image including the elements E2 and E3 corresponding to the detected partition lines and the second image including the element E1 corresponding to the road are superimposed on each other and the display device 32 is caused to display the superimposed image, and in the second section of the road that does not overlap the detection regions of the sensors, the display device 32 is caused to display the second image without superimposing the first image. Therefore, an occupant compares the first section with the second section on the same screen, and thus it is possible to allow the occupant to understand that the vehicle system 1 can correctly recognize a partition line required in the LKAS or ALC. As a result, it is possible to give a sense of security to an occupant under driving assistance or automated driving.

[Hardware Configuration]

Figure 10:
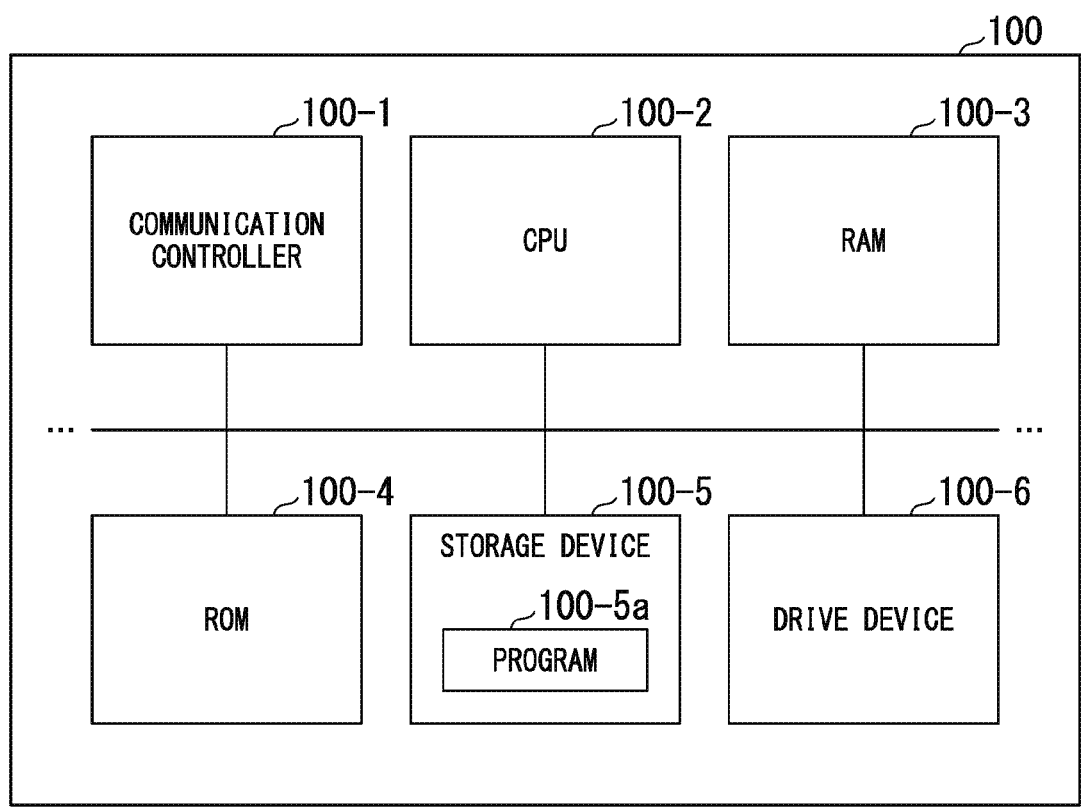
FIG. 10 is a diagram showing an example of a hardware configuration of an automated driving control device according to the embodiment.

FIG. 10 is a diagram showing an example of a hardware configuration of the automated driving control device 100 of the embodiment. As shown in the drawing, the automated driving control device 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the first controller 120, the second controller 160, and the third controller 170 are realized.

The above-described embodiment can be represented as follows.

A display control device including:
a display that is configured to display information;
a detector that is configured to detect a partition line for partitioning a lane on a road on which a vehicle is present;
a storage device that is configured to store a program; and
a processor,
wherein the processor is configured to execute the program, to thereby
cause the display to display the partition line detected by the detector variably, and
change a length of the partition line which is displayed by the display on the basis of a detection distance of the detector.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display control device comprising:
a display that is configured to display information;
a detector that is configured to detect a partition line for partitioning a lane on a road on which a vehicle is present; and
a display controller that is configured to cause the display to display the partition line detected by the detector variably,
wherein the display controller is configured to change a length of the partition line which is displayed by the display on the basis of a detection distance of the detector,
wherein the detector includes a first sensor that is configured to detect the partition line from an image obtained by capturing the road and a second sensor that radiates electromagnetic waves to a periphery of the vehicle to detect another vehicle, and
in a case where the second sensor detects another vehicle in the second section, the display controller is configured to virtually extend the partition line detected by the first sensor in the first section up to the second section to superimpose the extended partition line on the road.

2. The display control device according to claim 1, wherein the display controller is configured to superimpose the partition line and the road and causes the display to display the superimposed image in a first section of the road that overlaps a detection region of the detector when seen from at least any one viewpoint, and cause the display to display the road without superimposing the partition line in a second section of the road that does not overlap the detection region when seen from the viewpoint.

3. The display control device according to claim 1, wherein the display controller is configured to convert the partition line detected by the detector into a linear shape and cause the display to display the converted shape.

4. The display control device according to claim 1, wherein, in a case where the vehicle travels on a road which is not included in a map, the display controller is configured to cause the display to display the partition line and the road.

5. The display control device according to claim 1, wherein the vehicle is a vehicle of which at least one of steering or a speed is controlled, and in a case where the steering of the vehicle is controlled, the display controller is configured to cause the display to display the partition line.

6. A display control method comprising causing a computer mounted in a vehicle including a display that is configured to display information and a detector that is configured to detect a partition line for partitioning a lane on a road on which the vehicle is present to:

cause the display to display the partition line detected by the detector variably; and change a length of the partition line which is displayed by the display on the basis of a detection distance of the detector, wherein the detector includes a first sensor that is configured to detect the partition line from an image obtained by capturing the road and a second sensor that radiates electromagnetic waves to a periphery of the vehicle to detect another vehicle, and the display control method further comprising causing the computer to:

in a case where the second sensor detects another vehicle in the second section, virtually extend the partition line detected by the first sensor in the first section up to the second section to superimpose the extended partition line on the road.

7. A computer readable non-transitory storage medium having a program stored therein, the program causing a computer mounted in a vehicle including a display that is configured to display information and a detector that is configured to detect a partition line for partitioning a lane on a road on which the vehicle is present to execute:

causing the display to display the partition line detected by the detector variably; and changing a length of the partition line which is displayed by the display on the basis of a detection distance of the detector, wherein the detector includes a first sensor that is configured to detect the partition line from an image obtained by capturing the road and a second sensor that radiates electromagnetic waves to a periphery of the vehicle to detect another vehicle, and the program further causing the computer to execute:

in a case where the second sensor detects another vehicle in the second section, virtually extend the partition line detected by the first sensor in the first section up to the second section to superimpose the extended partition line on the road.

* * * * *